(12) United States Patent
Garces et al.

(10) Patent No.: US 11,379,986 B2
(45) Date of Patent: Jul. 5, 2022

(54) SURFACE COLOR SEGMENTATION (71) Applicant: InterDigital CE Patent Holdings, Paris (FR)

(72) Inventors: Elena Garces, Rennes (FR); Erik Reinhard, Cesson-Sevigne (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 16/768,317

(22) PCT Filed: Nov. 30, 2018

(86) PCT No.: PCT/EP2018/083211
§ 371 (c)(1),
(2) Date: May 29, 2020

(87) PCT Pub. No.: WO2019/106180
PCT Pub. Date: Jun. 6, 2019

(65) Prior Publication Data
US 2021/0183066 A1     Jun. 17, 2021

(30) Foreign Application Priority Data
Dec. 1, 2017   (EP) .................................... 17306683

(51) Int. Cl.
*G06T 7/11*     (2017.01)
*G06T 7/60*     (2017.01)
(Continued)

(52) U.S. Cl.
CPC .................. *G06T 7/11* (2017.01); *G06T 7/60* (2013.01); *G06T 7/90* (2017.01); *G06V 10/26* (2022.01);
(Continued)

(58) Field of Classification Search
CPC ........... G06K 9/4652; G06T 7/11; G06T 7/60; G06T 7/90; G06T 2207/10024; G06T 2207/10052; G06V 10/26; G06V 10/56
See application file for complete search history.

(56) References Cited

U.S. PATENT DOCUMENTS

2006/0008140 A1   1/2006  Imamura et al.
2017/0256059 A1*  9/2017  Tosic ......................... G06T 7/11
2017/0263012 A1*  9/2017  Sabater ....................... G06T 7/11

OTHER PUBLICATIONS

Hog et al. ("Superrays for Efficient Light Field Processing," IEEE Journal of Selected Topics in Signal Processing (vol. 11, Issue: 7, Oct. 2017)) (Year: 2017).*

(Continued)

*Primary Examiner* — Yubin Hung
(74) *Attorney, Agent, or Firm* — Julian F. Santos (57) ABSTRACT

In image segmentation it is usually assumed that all the surfaces of a scene are reflecting light in a perfectly diffuse or Lambertian manner. However, most existing surfaces are non-Lambertian surfaces. Examples of non-Lambertian surfaces are specular, glossy or mirror-like surfaces whose appearance may change depending on the point of view of the scene. The method according to an embodiment of the invention does not make the assumption that surfaces of objects in the view are perfect Lambertian reflectors by providing a surface color segmentation which takes into account the change in appearance due to the nature of the surfaces.

20 Claims, 2 Drawing Sheets

(51) Int. Cl.
G06T 7/90 (2017.01)
G06V 10/26 (2022.01)
G06V 10/56 (2022.01)

(52) U.S. Cl.
CPC .... *G06V 10/56* (2022.01); *G06T 2207/10024* (2013.01); *G06T 2207/10052* (2013.01)

(56) References Cited

OTHER PUBLICATIONS

Wu et al. ("Light Field Image Processing: An Overview," IEEE Journal of Selected Topics in Signal Processing (vol. 11, Issue: 7, Oct. 2017)) (Year: 2017).*
Mihara et al. ("4d light field segmentation with spatial and angular consistencies," IEEE International Conference on Computational Photography; Date of Conference: May 13-15, 2016) (Year: 2016).*
Birkus ("Accelerated gSLIC for superpixel generation used in object segmentation," Proc. 19th Central Eur. Semin. Comput. Graph., vol. 15, 2015) (Year: 2015).*
Yang et al. ("Graph-based segmentation for RGB-D data using 3-D geometry enhanced superpixels," IEEE Trans. Cybern., vol. 45, No. 5, pp. 927-940, May 2015) (Year: 2015).*
Levoy et al. ("Light Field Rendering," Proc. ACM SIGGRAPH, Jul. 1996) (Year: 2016).*
Sheng et al. ("Segmentation of light field image with the structure tensor," IEEE International Conference on Image Processing; Date Added to IEEE Xplore: Aug. 19, 2016) (Year: 2016).*
Xu et al. ("TransCut: Transparent Object Segmentation from a Light-Field Image," IEEE International Conference on Computer Vision; Date Added to IEEE Xplore: Feb. 18, 2016) (Year: 2016).*
Wanner et al. ("Globally Consistent Multi-label Assignment on the Ray Space of 4D Light Fields," IEEE Conference on Computer Vision and Pattern Recognition: Date Added to IEEE Xplore: Oct. 3, 2013) (Year: 2013).*
Hog et al. ("Light-Field Segmentation using a Ray-Based Graph Structure," European Conference on Computer Vision (ECCV2016). First Online: Sep. 16, 2016) (Year: 2016).*
Zhu, H., Zhang, Q. & Wang, Q., "4D light field superpixel and segmentation,". 2017 s.l., IEEE Conference on Computer Vision and Pattern Recognition.
Micusik_etal, "Multi-view-Superpixel-Stereo-in-Urban-Environments," Aug. 2010, International Journal of Computer Vision | vol. 89, No. 1 | 106-19.
Djelouah_etal_"N-Tuple-Color-Segmentation-for-Multi-View-Silhouette-Extraction," .Computer Vision—ECCV 2012. Proceedings of the 12th European Conference on Computer Vision.
Delon, J., Desolneux, A., Lisani, J. L. & Petro, A. B., "A nonparametric approach for histogram segmentation," 2007 IEEE Transactions on Image Processing, 16(1).
Garces_et al, "LIght-field surface color segmentation with an application to intrinsic decomposition," 2018 Winter Conference on Applications of Computer Vistion.
Mihara et aL, "4d light-field segmentation with spatial and angular consistencies", IEEE International Conference on Computational Photography (ICCP) 2016. http://omilab.naist.jp/project/LFseg/.
Kim_etal_"Multi-View-Object-Extraction-With-Fractional-Boundaries," IEEE Transactions on Image Processing Aug. 2016, vol. 25, No. 8, 3639-54.
Djelouah et al., "Sparse-multi-view-consistency-for-object-segmentation," IEEE Transactions On Pattern Analysis and Machine Intelligence, vol. 37, No. 9, Sep. 2015.pdf.
Bonneel, N. et al., "Consistent Video Filtering for Camera Arrays," 2017, Computer Graphics Forum (Eurographics).
Wang et al., "Wide-Baseline-Multi-View-Video-Matting-using-a-Hybrid-Markov-Random-Field," 2014 22nd International Conference on Pattern Recognition (ICPR).
Krähenbühl, P. & Koltun, V., "Efficient inference in fully connected crfs with gaussian edge potentials". 2011 Advances in neural information processing systems.
Bodis-Szomoru_etal, "Fast-Approximate-Piecewise-Planar-Modeling-Based-on-Sparse-Structure-from-motion and Superpixels," 2014 IEEE Conference on Computer Vision and Pattern Recognition (CVPR).
Jeong et al., "Object Segmentation Ensuring Consistency across Multi-Viewpoint-Images," Journal of Latex Class Files, vol. 14, No. 8, Aug. 2015.
Chaurasia, G., Duchene, S., Sorkine-Hornung, O. & Drettakis, G., "Depth synthesis and local warps for plausible image-based navigation," 2013. ACM Trans. Graph., 32(3).
Garces_etal, "Intrinsic-Images-by-Clustering," 2012, Eurographics Symposium on Rendering 2012, vol. 31 (2012), No. 4.
Anonymous—"Color-based segmentation using the L*a*b* Color Space," —MATLAB & Simulink Example—MathWorks Deutschland11 , Apr. 27, 2017, Retrieved from the Internet: URL:https://web.archive.org/web/20170427195816/https://de.mathworks.com/help/images/examples/color-based-segmentation-using-thpdf.
Hog, M., Sabater, N. & Guillemot, C., "Super-rays for Efficient Light Field Processing," 2017 IEEE Journal of Selected Topics in Signal Processing, vol. 11, No. 7, Oct. 2017.

* cited by examiner

ABSTRACT# SURFACE COLOR SEGMENTATION

This application is the national stage of International Application PCT/EP2018/083211, filed Nov. 30, 2018, which claims priority to European patent application 17306683.8, filed Dec. 1, 2017

TECHNICAL FIELD

The present invention relates to a method for segmenting a view and more particularly for segmenting light-field contents.

BACKGROUND

In image processing, image segmentation is a process of partitioning an image, or a view, into multiple segments, i.e. sets of pixels. The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

The result of image segmentation is a set of segments that collectively cover the entire image, or a set of contours extracted from the image. Each of the pixels in a region are similar with respect to some characteristic, such as intensity, or texture. Adjacent regions are significantly different with respect to the same characteristic(s).

In image segmentation it is usually assumed that all the surfaces of a scene are reflecting light in a perfectly diffuse or Lambertian manner. However, most existing surfaces are non-Lambertian surfaces. Examples of non-Lambertian surfaces are specular, glossy or mirror-like surfaces whose appearance may change depending on the point of view of the scene.

The present invention has been devised with the foregoing in mind.

SUMMARY OF INVENTION

According to a first aspect of the invention there is provided a computer implemented method for segmenting at least one view comprising:
  determining a color palette for said view, the number of colors of said color palette corresponding to a number of labels to be used for segmenting at least said view,
  associating at least one pixel of the view to one of said labels as a function of a distance or difference between an actual color of said pixel and a color of a label.

The method according to an embodiment of the invention is not limited to images directly acquired by an optical device. These data may be Computer Graphics Image (CGI) that are totally or partially simulated by a computer for a given scene description. Another source of images may be post-produced data that are modified, for instance color graded, images obtained from an optical device or CGI. It is also now common in the movie industry to have data that are a mix of both image types acquired using an optical acquisition device, and CGI data.

Using the color palette for determining the number of labels to be used for segmenting the view provides a more robust estimation than other metrics used in the prior art such as k-means clustering. Furthermore, using the color palette for determining the number of labels does not require an interaction from a user for setting the number of labels.

The method according to an embodiment of the invention does not make the assumption that surfaces of objects in the view are perfect Lambertian reflectors by providing a surface color segmentation which takes into account the change in appearance due to the nature of the surfaces.

According to an embodiment of the invention, associating at least one pixel of the view to one of said labels consists of optimizing the energy function given by:

$$E(x|L') = \sum_{i \in L'} \psi_u(i) + \sum_{i<j} \psi_p(i,j)$$

where: $\psi_u(i) = \sum_{c \in a,b} |\alpha^c(x_i) - f^c(r_i)|$ is a unitary potential, is a pairwise potential, and $$\psi_p(i,j) = \tau(i,j) \exp\left(-\frac{\|w \odot (f(r_i) - f(r_j))\|_2^2}{2}\right)$$

is a pairwise potential, and $$\Sigma(i,j) = \|\log(\alpha(x_i)) - \log(\alpha(x_j))\|_1$$

and where $f(r_i) = [x', y', L, a, b]$ being a vector representing a pixel of the view, x', y' being the coordinates of the pixel in the view and L, a, b representing the color of the pixel; $\alpha^c(x_i)$ is a value of a color channel, $\alpha(x_i)$ is a color of a label, $\tau(i,j)$ a penalty for label compatibility, and w is a vector having five coordinates representing weights to be applied to each coordinates of $f(r_i)$.

In such an embodiment, the unitary potential penalizes each pixel of the view which has a color very different from a color of a label and the pairwise potential forces pixels with similar feature vectors to have similar labels.

In an embodiment of the invention, the CIELab color space is used, but other color spaces may be used as well such as YUV, RGB, XYZ, YCbCr or YCpCt for example.

An optimization method used to optimize the energy function is for example the method disclosed in P. Krähenbühl and V. Koltun. Efficient Interference in Fully Connected CRFs With Gaussian Edge Potentials. In Advances in Neural Information Processing Systems, pages 109-117, 2011.

According to an embodiment of the invention, when the at least one view belongs to a light-field content, the method further comprises:
  selecting a reference view and at least another view from the light-field content, said color palette being determined from said reference view,
  determining for the reference view and the other view at least one set of super-rays, a super-ray being a group of rays of light belonging to a same area of a scene with uniform color,
  regrouping groups of pixels whose labels have similar color in a same set of pixels by determining if a set of super-rays intersects a boundary between said groups of pixels, To capture larger scenes, the spacing between cameras of a camera-rig has to be larger. A wide space between cameras results in a sparse light-field.

Processing a light-field content relies on the derivatives in the angular domain to impose constraints or fit parametric models to extract surface properties. In the case of a sparse light-field the estimation of these derivatives may be unreliable forbidding the use of existing processing techniques designed for light-fields.

One drawback of sparse light-field is that the amount of information available in sparse light-field does not allow for rich surface prediction. In the case of non-Lambertian surfaces such as specular, glossy or mirror-like surfaces whose appearance may change depending on the point of view of the scene, the sparsity of a sparse light-field becomes critical. Indeed, a same glossy surface may have different colors in different views of the sparse light-field. In order to segment the surface of an object having a glossy surface into its different colors the differences between the views of the light-field need to be accounted for.

In order to overcome this drawback, the inventors of the present invention propose to over-segment the views of the sparse light-field into super-rays. This kind of over-segmentation provides a soft geometric decomposition of a scene.

The reference view corresponds to the central view of a camera rig, the other views correspond to the views taken from a camera located on each corner of the camera rig. Using these views enables the consideration of occlusions and view-dependent effects while keeping computational complexity low since only a small number views of the light-field are considered. A larger set of views may be selected in which case the computation complexity is higher but accuracy may be improved.

According to an embodiment of the invention, the method further comprises propagating parameters representative of said set of pixels to the other views of the light-field content.

Thus a user does not have to apply the segmentation technique to each view of the light-field independently.

According to an embodiment of the invention, determining if a set of super-rays B ($c_i$, $c_k$) intersects a boundary between said groups of pixels $c_i$, $c_k$ consists of for a super-ray:

determining a color coherence $$\beta^p = \exp\left(-\frac{\|[\sigma(\alpha^L(x_i)), \sigma(\alpha^a(x_i)), \sigma(\alpha^b(x_i))]\|_2}{0.01}\right)$$

where $\sigma(\alpha^c(x_i))$ is a standard deviation in color channel c for a group of pixels $\{r_i\}$ inside a super-ray p, $$\lambda^p(c_k) = \frac{\sum_{i \in q_k} \|r_i - \text{centroid}(\{r_m \mid m \in q_k\})\|_2^2}{\max(w, h)}$$

$$w = \max_{i \in q_k}(x'_i) - \min_{i \in q_k}(x'_i)$$

$$h = \max_{i \in q_k}(y'_i) - \min_{i \in q_k}(y'_i)$$

$q_k = \{i \mid r_i \in p \wedge (r_i) = c_k \wedge c_k \in \phi_u(p) \wedge |c_k| > \mu |p|\}$, where $\phi_u(p)$ is the distinct group of pixels which are present in the super-ray, determining a fuzziness $\rho^p = \max(\{\lambda^p(c_k) \mid c_k \in \phi_u(p)\})$ generating, based on these measures, a graph $G = (V, E)$ where V is a set of nodes $v_i$ which corresponds to a segment and E is a set of weighted edges, determining a weight $$w_{i,j} = \frac{1}{2|B(c_i, c_k)|} \sum_{p \in B(c_i, c_k)} \rho^p \rho^p$$

where $B(c_i, c_k) = \{p \mid c_i, c_k \in \phi_u(p) \wedge c_i \neq c_k \wedge p \in P(L)\}$ Merging nodes if $w_{i,k}$ is smaller than a given threshold.

According to an embodiment of the invention, prior to determining the color palette the method comprises:

selecting an object in said reference image, propagating said selected objects in the other views of the light-field content.

Another object of the invention concerns a device capable of segmenting at least one view comprising at least one hardware processor configured to:

determine a color palette for said view, the number of colors of said color palette corresponding to a number of labels to be used for segmenting said view, associate at least one pixel of the view to one of said labels as a function of a difference between an actual color of said pixel and a color of a label.

According to an embodiment of the invention, associating at least one pixel of the view to one of said labels consists in optimizing the energy function given by:

$$E(x \mid L') = \sum_{i \in L'} \psi_u(i) + \sum_{i < j} \psi_p(i, j)$$

where: $\psi_u(i) = \Sigma_{c \in a,b} |\alpha^c(x_i) - f^c(r_i)|$;

$$\psi_p(i, j) = \tau(i, j) \exp\left(-\frac{\|w \odot (f(r_i) - f(r_j))\|_2^2}{2}\right); \text{ and}$$

$$\tau(i, j) = \|\log(\alpha(x_i)) - \log(\alpha(x_j))\|_1$$

and $$\tau(i,j) = \|\log(\alpha(x_i)) - \log(\alpha(x_j))\|_1$$

and where $f(r_i) = [x', y', L, a, b]$ being a vector representing a pixel of the view, x', y' being the coordinates of the pixel in the view and L, a, b representing the color of the pixel; $\alpha^c(x_i)$ is a value of a color channel, $\alpha(x_i)$ is a color of a label, $\tau(i,j)$ a penalty for label compatibility, and w is a vector having five coordinates representing weights to be applied to each coordinates of $f(r_i)$.

According to an embodiment of the invention, when the at least one view belongs to a light-field content, said hardware processor is further configured to:

select a reference view and at least another view from the light-field content, said color palette being determined from said reference view, determine for the reference view and the other view at least one set of super-rays, a super-ray being a group of rays of light belonging to a same area of a scene with uniform color, regroup groups of pixels whose labels have similar color in a same set of pixels by determining if a set of super-rays intersects a boundary between said groups of pixels, According to an embodiment of the invention, the parameters representative of said set of pixels are propagated to the other views of the light-field content.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium (a) may be utilized.

Table 1 summarizes the notations used throughout the following description of the different embodiments of the invention.

TABLE 1

| | |
|---|---|
| Light field | $L$ |
| Image plane | $\Omega_{xy}$ |
| Sensor plane | $\Pi_{uv}$ |
| Number of views | $m \times n$ |
| View | $L_{ij}$ |
| Reference view | $L_{u_c, v_c}$ |
| Key views | $L^* = \{L_{00}, L_{M0}, L_{u_c v_c}, L_{0N}, L_{MN}\}$ |
| Ray | $r = (x, y, u, v)$ |
| Super-ray | $p$ |
| Set of all super-rays | $P(L) = \{p\}$ |
| Segment of a ray | $\phi(r)$ |
| Color palette: set of CIELab colors | $\mathcal{P}(L_{u_c, v_c}) = \{a_0, a_1, \ldots, a_k\}$ |
| Label | $x$ |

TABLE 1-continued

| | |
|---|---|
| CIELab color of a label | $\alpha(x)$ |
| Color channel of a label | $\alpha^c(X), c \in \{L, a, b\}$ |
| Energy for the CRF | $E$ |
| Feature vector of a ray | $f(r) = [x', y', L, a, b]$ |
| Label compatibility | $\tau(i, j)$ |
| Unique segments per super-ray | $\phi_u(P)$ |
| Color coherence | $\beta^P(c_k)$ |
| Fuzziness per super-ray and segment | $\lambda^P(c_k)$ |
| Fuzziness | $\rho^P$ |
| Edge weights | $w_{i,k}$ |

Figure 1:
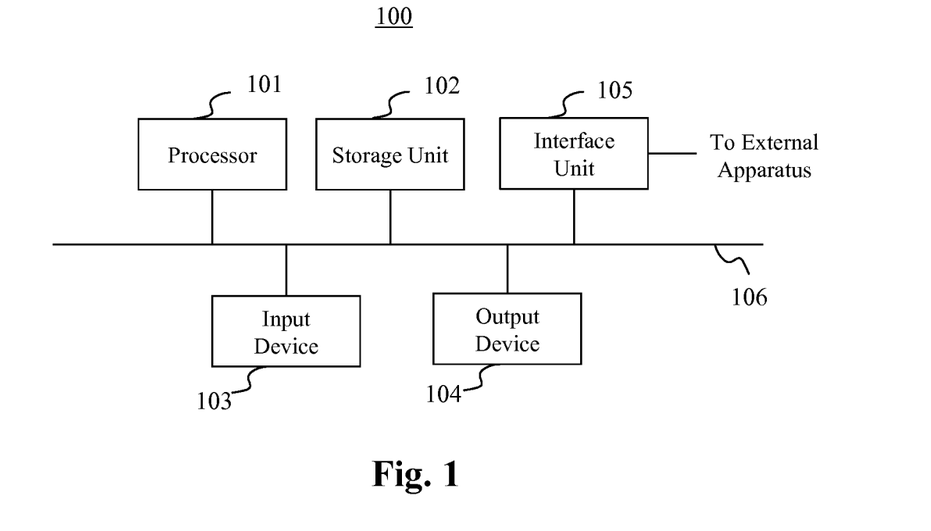
FIG. 1 is a schematic block diagram illustrating an example of a device capable of executing the method according to an embodiment of the invention.

FIG. 1 is a schematic block diagram illustrating an example of a device capable of executing the method according to an embodiment of the invention.

The apparatus 100 comprises a processor 101, a storage unit 102, an input device 103, a display device 104, and an interface unit 105 which are connected by a bus 106. Of course, constituent elements of the computer apparatus 100 may be connected by a connection other than a bus connection.

The processor 101 controls operations of the apparatus 100. The storage unit 102 stores at least one program to be executed by the processor 101, and various data, including data of images captured and provided by a camera, parameters used by computations performed by the processor 101, intermediate data of computations performed by the processor 101, and so on. The processor 101 may be formed by any known and suitable hardware, or software, or a combination of hardware and software. For example, the processor 101 may be formed by dedicated hardware such as a processing circuit, or by a programmable processing unit such as a CPU (Central Processing Unit) that executes a program stored in a memory thereof.

The storage unit 102 may be formed by any suitable storage or means capable of storing the program, data, or the like in a computer-readable manner. Examples of the storage unit 102 include non-transitory computer-readable storage media such as semiconductor memory devices, and magnetic, optical, or magneto-optical recording media loaded into a read and write unit. The program causes the processor 101 to perform a process for segmenting an image according to an embodiment of the present disclosure as described with reference to FIG. 2.

The input device 103 may be formed by a keyboard 10, a pointing device 11 such as a mouse, or the like for use by the user to input commands, etc. The output device 104 may be formed by a display device 12 to display, for example, a Graphical User Interface (GUI), images generated according to an embodiment of the present disclosure. The input device 103 and the output device 104 may be formed integrally by a touchscreen panel, for example.

The interface unit 105 provides an interface between the apparatus 100 and an external apparatus. The interface unit 105 may be communicable with the external apparatus via cable or wireless communication. In an embodiment, the external apparatus may be a camera. In this case, data images captured by the camera can be input from the camera to the apparatus 100 through the interface unit 105, then stored in the storage unit 102. In another embodiment, the device 100 receives Computer Graphics Image (CGI) data that are totally or partially simulated by a computer for a given scene description. Another source of data may be post-produced data that are modified, for instance color graded, images obtained from an optical device or CGI. It is also now common in the movie industry to have data that are a mix of both images acquired using an optical acquisition device, and CGI data.

In this embodiment the apparatus 100 is exemplary discussed as it is separated from the camera and they are communicable each other via cable or wireless communication, however it should be noted that the apparatus 100 can be integrated with such a camera. In this later case, the apparatus 100 may be for example a portable device such as a tablet or a smartphone embedding a camera.

Figure 2:
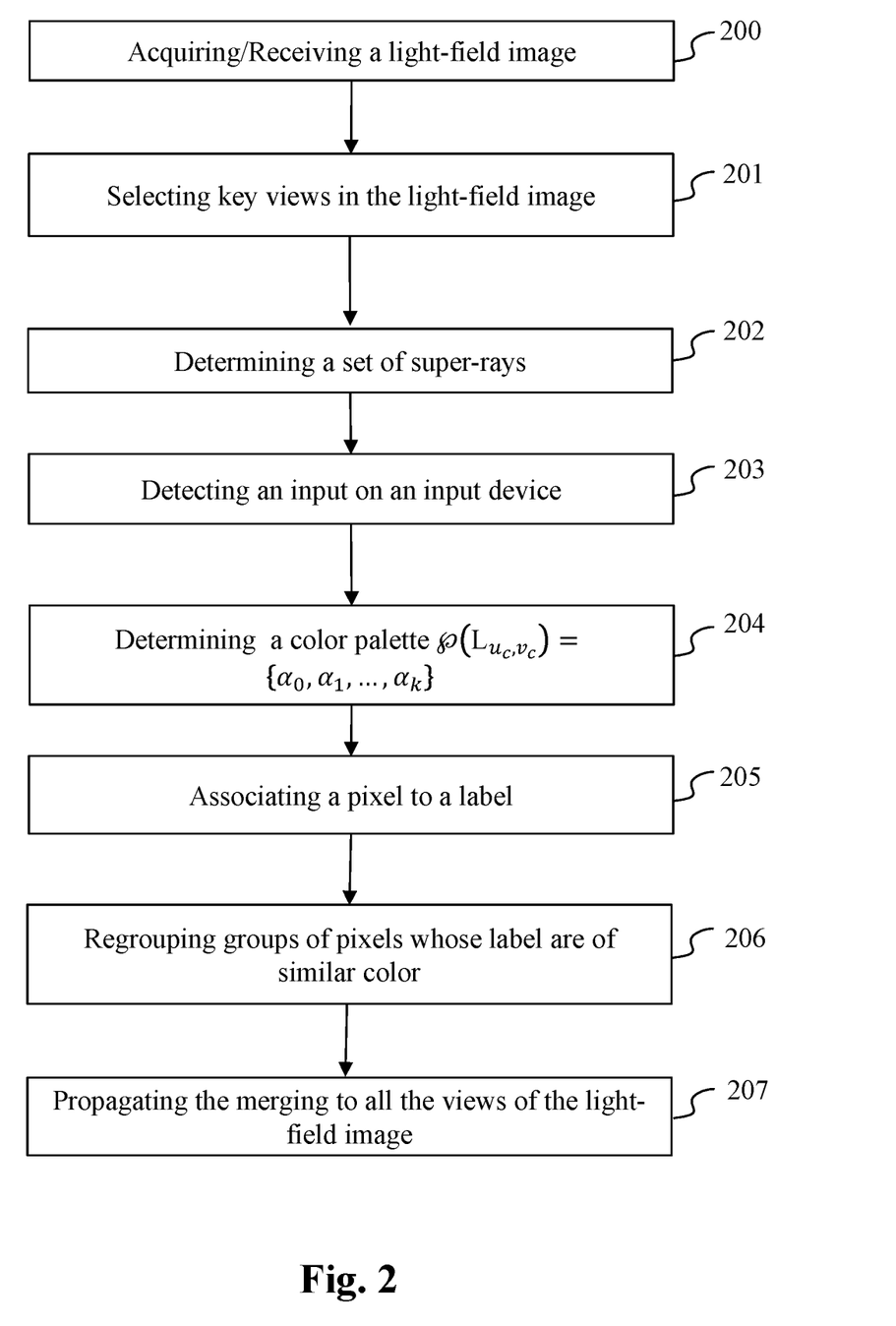
FIG. 2 is a flowchart representing the steps of a method for segmenting an image, or a view, according to an embodiment of the invention.

FIG. 2 is a flowchart representing the steps of a method for segmenting an image, or a view, according to an embodiment of the invention. Such a method for segmenting an image applies both to classical 2D (2-dimensional) images and light-field images.

In a step 200, the device 100 acquires or receives, depending on whether it is connected to a camera, an image I. In a first embodiment of the invention, the image I is a classical 2D image. In a second embodiment of the invention, the image I is a light-field image comprising a plurality of views. Such a light-field image may be acquired by a plenoptic camera or by a camera array also known as a camera rig.

When the image I is a light-field image, said light-field image is represented as a two-plane parametrization on ray space L(x, y, u, v), where a light ray r∈L passes through two parallel planes: the sensor plane $\Pi_{uv}$, and the virtual camera plane or image plane $\Omega_{xy}$. $L_{i,j}(x, y)$ or $L_{i,j}$ denotes a view of the light field that cuts the sensor plane of a camera at coordinates (u=i, v=j). A reference view of the light field is defined as $L_{u_c,v_c}$ with $$u_c = \left\lfloor \frac{m}{2} \right\rfloor \text{ and } v_c = \left\lfloor \frac{n}{2} \right\rfloor$$

for a sensor plane of size m×n.

One goal of the method according to embodiments of the invention is to find a set of segments $\Phi=\{c_k\}$ with coherent surface color across the multiple views of the light field.

In a step 201, when the image I is a light-field image, the processor 101 of the device 100 selects key views L' in the light-field image I. The key views are for example a reference view and at least another view from the light-field image, said color palette being determined from said reference view. In an embodiment of the invention, the key views L' are the reference view and extrema views, which in the case of a camera rig correspond to views acquired by the cameras located on the corners of the camera rig, $L'=\{L_{0,0}, L_{m,0}, L_{u_c,v_c}, L_{0,n}, L_{m,n}\}$ since they cover the highest variability in terms of occlusions and color variations with view-point changes.

In a step 202, the processor 101 determines for each of the key views L' a set of super-rays P(L)={p}. A super-ray being a group of rays of light belonging to a same area of a scene with approximately uniform color and imaged in a plurality of views. The super-rays provide disparity values d(x, y, u, v) for each ray of light of the light-field image I.

The disparity values are then used to reparametrize all the rays of light of the light-field image I into the reference view. Consequently, each ray of light of the light-field image I may have new coordinates x'=x+(u−$u_c$) d(x, y, u, v) and y'=y+ (v−$v_c$) d(x, y, u, v) in the reference view, where x, y, u, v are the former coordinates of the ray of light.

In an optimal step 203, the processor 101 of the device 100 detects an input on the input device 103 which corresponds to a user selecting an object in the image I. Step 203 may be run on a classical 2D image or on a light-field image.

When the image I is a light-field image, the processor 101 propagates the selection to all the views of the light-field image using known propagation techniques such as the technique disclosed in M. Hog, N. Sabater and C. Guillemot. Super-rays for Efficient Light-Field Processing. IEEE Journal of Selected Topics in Signal Processing, 2017.

In a step 204, the processor 101 determines a color palette $\wp(L_{u_c,v_c})=\{\alpha_0, \alpha_1, \ldots, \alpha_k\}$ of the image I. When image I is a light-field image, the processor determines the color palette $\wp(L_{u_c,v_c})=\{\alpha_0, \alpha_1, \ldots, \alpha_k\}$ of the reference view of the light-field image. The color palette $\wp(L_{u_c,v_c})=\{\alpha_0, \alpha_1, \ldots, \alpha_k\}$ may be determined using the method disclosed in J. Delon, A. Desolneux, J-L. Lisani and A. B. Petro. A Non-parametric Approach of Histogram Segmentation. IEEE Transactions on Image Processing, 16(1)/253-261, 2007.

The processor 101 then determines the number of labels to be used for segmenting image I since the number of labels corresponds to the number of colors of the color palette $\wp(L_{u_c,v_c})=\{\alpha_0, \alpha_1, \ldots, \alpha_k\}$.

In a step 205, the processor 101 associates the pixels of image I to one of said labels as a function of a difference between an actual color of said pixel and a color of a label. When image I is a light-field image, the processor executes step 205 on each of the key views selected during step 201.

Associating said labels to pixels of image I consists of optimizing the energy function given by:

$$E(x \mid L') = \sum_{i \in L'} \psi_u(i) + \sum_{i<j} \psi_p(i, j)$$

where: $\psi_u(i) = \sum_{c \in a,b} |\alpha^c(x_i) - f^c(r_i)|$ is a unitary potential, $$\psi_p(i, j) = \tau(i, j) \exp\left(-\frac{\|w \odot (f(r_i) - f(r_j))\|_2^2}{2}\right)$$

is a pairwise potential, and $$\tau(i,j) = \|\log(\alpha(x_i)) - \log(\alpha(x_j))\|_1$$

and where $f(r_i)=[x', y', L, a, b]$ being a vector representing a pixel of the view, x', y' being the coordinates of the pixel in the view and L, a, b representing the color of the pixel; $\alpha^c(x_i)$ is a value of a color channel, $\alpha(x_i)$ is a color of a label, $\tau(i,j)$ a penalty for label compatibility, and w is a vector having five coordinates representing weights to be applied to each of the coordinates of $f(r_i)$.

In such an embodiment, the unitary potential penalizes each pixel of the view which has a color very different from a color of a label and the pairwise potential forces pixels with similar feature vectors to have similar labels.

An optimization method used to optimize the energy function is for example the method disclosed in P. Krähenbühl and V. Koltun. Efficient Interference in Fully Connected CRFs With Gaussian Edge Potentials. In Advances in Neural Information Processing Systems, pages 109-117, 2011.

In a step 206, the processor 101 regroups groups of pixels whose labels have similar color in a same set of pixels by determining if a set of super-rays intersects a boundary between said groups of pixels. Step 205 produces a color segmentation of image I which may be over-segmented, due for example to shadows or high-lights. This may impact the final segmentation of image I.

To overcome this issue, step 206 is executed. To merge segments of image I which corresponds to a same surface. Since the processor 101 uses information related to the super-rays while executing step 206, this step is only executed when step 202 is executed.

Determining if a set of super-rays $B(c_i, c_k)$ intersects a boundary between said groups of pixels $c_i$, $c_k$ consists in computing for each super-ray:
the color coherence $$\beta^p = \exp\left(-\frac{\|[\sigma(\alpha^L(x_i)), \sigma(\alpha^a(x_i)), \sigma(\alpha^b(x_i))]\|_2}{0.01}\right)$$

where $\sigma(\alpha^c(x_i))$ is a standard deviation in color channel c for a group of pixels $\{r_i\}$ inside a super-ray p, $$\lambda^P(c_k) = \frac{\sum_{i \in q_k} \|r_i - \text{centroid}(\{r_m \mid m \in q_k\})\|_2^2}{\max(w, h)}$$

$$w = \max_{i \in q_k}(x'_i) - \min_{i \in q_k}(x'_i)$$

$$h = \max_{i \in q_k}(y'_i) - \min_{i \in q_k}(y'_i)$$

$q_k = \{i \mid r_i \in p \land \phi(r_i) = c_k \land c_k \in \phi_u(p) \land |c_k| > \mu|p|\}$, where $\phi_u(p)$ is the distinct group of pixels which are present in the super-ray,
the fuzziness $\rho^p = \max(\{\lambda^P(c_k) \mid c_k \in \phi_u(p)\})$.

Then, based on these measures per super-ray, a graph $G=(V,E)$ where V is a set of nodes $v_i$ which corresponds to a segment, i.e. $V=\{v_i=c_i\}$ and E is a set of weighted edges, where two nodes are neighbors when they are connected in a 4-neighborood in an image plane of the light-field image.

A weight $w_{i,j}$ is given by $$w_{i,j} = \frac{1}{2|B(c_i, c_k)|} \sum_{p \in B(c_i, c_k)} \rho^p \rho^p$$

where
$B(c_i, c_k) = \{p \mid c_i, c_k \in \phi_u(p) \land c_i \neq c_k \land p \in P(L)\}$ which is the super-ray which intersect the boundaries between segments $c_i$, and $c_k$. The nodes are merged if $w_{i,k}$ is smaller than a given threshold. For example, in an embodiment of the invention, $w_{i,k} < 0.02$.

In step 207, the processor 101 propagates the merging determined during step 206 to all the views of the light-field image using known propagation techniques.

The method according to the invention may provide an image representing the segmentation of image I, i.e. an image in which each segment has a color corresponding to its label or a data file in which in pixel of the image I is associated to a segment and its label.

The segmentation of the image I obtained after executing the method according to an embodiment of the invention may be used as input data for an intrinsic light-field decomposition method.

Intrinsic decomposition is process of reverse-engineering the process of image formation. More particularly, any pixel recorded by a camera corresponds to light having reflected off a surface in a scene. Intrinsic decomposition splits an image I into a first component representing the reflectance R of the imaged surface, and a second component S representing the illumination incident upon that surface so that $I=R\odot S$. this is an under-constrained problem in classical 2 mages as well as in light-field images for which I=L.

In light-field images however, a same scene point is imaged in different views from different vantage points. The broader the baseline of the light-field image the more potential for analysis said light-field image offers in this respect. Using the segmentation method according to the different embodiments of the invention enables a meaningful intrinsic decomposition.

Using the segmentation resulting from the execution of the method according to an embodiment of the invention in the decomposition enable to obtain a gray-scale shading component s=log S by minimizing a linear system of equations according for example to the method disclosed in E. Garces, A. Munoz, J. Lopez-Moreno, and D. Gutierrez. Intrinsic Images by Clustering. Computer Graphics Forum (Proc. EGSR), 31(4), 2012.

As a consequence of having segmented the light-field image, there is only one unknown left per segment $c_k$, so that it possible to impose shading smoothness constrains between pairs of neighboring segments:

$$\min_s \sum_{c_k \sim c_l} (s_k - s_l)^2$$

where $c_k$ and $c_l$ are neighboring segments in the light-field image plan, and the shading components $s_k$ and $s_l$ are computed as:

$$s_k = \bar{l}_k - r_k$$

$$\bar{l}_k = \frac{1}{|c_k|} \sum_{j \in c_k} \left(\frac{r_j^R + r_j^G + r_j^B}{3}\right)$$

Where $r_k$ refers to a reflectance color. Further $\bar{l}_k$ is the average value for all the rays within a segment k. This optimization may be solved globally in closed-form for the entire light-field image as the number of unknowns is significantly reduced by working with segments instead of rays. Then the light-field image reflectance R is determined as per pixel and per channel division: $R=L\oslash S$.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:
1. A computer implemented method for segmenting at least one view of light-field content, comprising:
selecting a reference view and at least one other view from the light-field content;

determining a color palette from the reference view, wherein the color palette has a plurality of colors corresponding to a plurality of labels used for segmenting the reference view and the at least one other view;

associating at least one pixel of the at least one other view to one of the plurality of labels based on a difference between an actual color of the at least one pixel and a color corresponding to the one of the plurality of labels;

determining, for the reference view and the at least one other view, at least one set of super-rays, wherein a super-ray is defined as a group of rays belonging to a same area of a scene with a uniform color, and wherein each super-ray has a color cohesion measure and a fuzziness measure; and regrouping groups of pixels whose labels have similar colors in a same set of pixels by determining if a set of the at least one set of super-rays intersects a boundary between the groups of pixels.

2. The method according to claim 1, wherein the color cohesion measure is a measure of color variation of the pixels within the super-ray.

3. The method of according to claim 2, wherein each super-ray has a centroid, and wherein the fuzziness measure is a measure of a spread of values of each segment inside the super-ray with respect to its centroid.

4. The method of according to claim 1, wherein each super-ray has a centroid, and wherein the fuzziness measure is the measure of a spread of values of each segment inside the super-ray with respect to its centroid.

5. The method according to claim 1, wherein associating at least one pixel of the at least one other view to one of the plurality of labels comprises optimizing an energy function given by:

$$E(x \mid L') = \sum_{i \in L'} \psi_u(i) + \sum_{i<j} \psi_p(i, j);$$

wherein:

$\psi_u(i) = \Sigma_{c \in a,b} |\alpha^c(x_i) - f^c(r_i)|;$ $$\psi_p(i, j) = \tau(i, j) \exp\left(-\frac{\|w \odot (f(r_i) - f(r_j))\|_2^2}{2}\right);$$

$\tau(i,j) = \|\log(\alpha(x_i)) - \log(\alpha(x_j))\|_1;$ $f(r_i) = [x', y', L, a, b]$ is a vector representing a pixel of the at least one other view, x', y' are coordinates of the pixel, L, a, b represent a color of the pixel;

$\alpha^c(x_i)$ is a value of a color channel;

$\alpha(x_i)$ is a color of a label;

$\tau(i,j)$ is a penalty for label compatibility; and w is a vector having five coordinates representing weights to be applied to each coordinates of $f(r_i)$.

6. The method according to claim 5, further comprising propagating parameters representative of the set of pixels to the at least one other view.

7. The method according to claim 1, wherein determining if a set of super-rays $B(c_i, c_k)$ intersects a boundary between said groups of pixels $c_i, c_k$ consists of, for a super-ray:

determining a color coherence $$\beta^p = \exp\left(-\frac{\|[\sigma(\alpha^L(x_i)), \sigma(\alpha^a(x_i)), \sigma(\alpha^b(x_i))]\|_2}{0.01}\right)$$

wherein:

$\sigma(\alpha^c(x_i))$ is a standard deviation in color channel c for a group of pixels $\{r_i\}$ inside a super-ray p;

$$\lambda^p(c_k) = \frac{\sum_{i \in q_k} \|r_i - \text{centroid}(\{r_m \mid m \in q_k\})\|_2^2}{\max(w, h)};$$

$w = \max_{i \in q_k}(x'_i) - \min_{i \in q_k}(x'_i);$ $h = \max_{i \in q_k}(y'_i) - \min_{i \in q_k}(y'_i);$ $q_k = \{i \mid r_i \in p \land \phi(r_i) = c_k \land c_k \in \phi_u(p) \land |C_k| > \mu|p|\};$ and $\phi_u(p)$ is the distinct group of pixels which are present in the super-ray;

determining a fuzziness $\rho^p = \max(\{\lambda^p(c_k) \mid c_k \in \phi_u(p)\});$ generating, based on these measures, a graph $G=(V,E)$ where V is a set of nodes $v_i$ which corresponds to a segment and E is a set of weighted edges;

determining a weight $$w_{i,j} = \frac{1}{2|B(c_i, c_k)|} \Sigma_{p \in B(c_i, c_k)} \rho^p \rho^p;$$

where $B(c_i, c_k) = \{p \mid c_i, c_k \in \phi_u(p) \land c_i \neq c_k \land p \in P(L)\};$ and merging nodes if $w_{i,k}$ is smaller than a given threshold.

8. The method according to claim 7, further comprising propagating parameters representative of the set of pixels to the at least one other view, wherein the color cohesion measure is a measure of color variation of the pixels within the super-ray, wherein each super-ray has a centroid, and wherein the fuzziness measure is a measure of a spread of values of each segment inside the super-ray with respect to its centroid.

9. The method according to claim 1, comprising:

prior to determining the color palette:

selecting at least one object in the reference view; and propagating the selected at least one objects in the at least one other view.

10. A device for segmenting at least one view of light field content, the device comprising at least one processor configured to:

select a reference view and at least one other view from the light-field content;

determine a color palette for the reference view, wherein the color palette has a plurality of colors for the reference view corresponding to a plurality of labels used for segmenting the reference view and the at least one other view;

associate at least one pixel of the at least one other view to one of the plurality of labels based on a difference between an actual color of the at least one pixel and a color corresponding to the one of the plurality of labels;

determine, for the reference view and the at least one other view, at least one set of super-rays, wherein a super-ray is defined as a group of rays belonging to a same area of a scene with a uniform color, and wherein each super-ray has a color cohesion measure and a fuzziness measure; and regroup groups of pixels whose labels have similar color in a same set of pixels by determining if a set of the at least one set of super-rays intersects a boundary between the groups of pixels.

11. The device according to claim 10, wherein the color cohesion measure is a measure of color variation of the pixels within the super-ray.

12. The device according to claim 11, wherein each super-ray has a centroid, and wherein the fuzziness measure is a measure of a spread of values of each segment inside the super-ray with respect to its centroid.

13. The device according to claim 10, wherein each super-ray has a centroid, and wherein the fuzziness measure is a measure of a spread of values of each segment inside the super-ray with respect to its centroid.

14. The device according to claim 10, wherein associating at least one pixel of the at least one other view to one of the plurality of labels consists of optimizing an energy function given by:

$$E(x \mid L') = \sum_{i \in L'} \psi_u(i) + \sum_{i<j} \psi_p(i, j),$$

wherein:

$\psi_u(i) = \Sigma_{c \in a,b} |\alpha^c(x_i) - f^c(r_i)|$;

$$\psi_p(i, j) = \tau(i, j) \exp\left(-\frac{\|w \odot (f(r_i) - f(r_j))\|_2^2}{2}\right);$$

$\tau(i,j) = \|\log(\alpha(x_j)) - \log(\alpha(x_j))\|_1$;

$f(r_i)=[x', y', L, a, b]$ is a vector representing a pixel of the at least one other view;

x', y' are coordinates of the pixel;

L, a, b represent a color of the pixel;

$\alpha^c(x_i)$ is a value of a color channel;

$\alpha(x_i)$ is a color of a label;

$\tau(i,j)$ is a penalty for label compatibility; and w is a vector having five coordinates representing weights to be applied to each coordinate of $f(r_i)$.

15. The device according to claim 14, wherein the at least one processor is configured to propagate parameters representative of the set of pixels to the at least one other view.

16. The device according to claim 15, wherein the color cohesion measure is a measure of color variation of the pixels within the super-ray, wherein each super-ray has a centroid, and wherein the fuzziness measure is a measure of a spread of values of each segment inside the super-ray with respect to its centroid.

17. A non-transitory, computer-readable medium having stored therein instructions for causing a processor to perform a method according to claim 1.

18. A non-transitory, computer-readable medium having stored therein instructions for causing a processor to perform a method according to claim 2.

19. A non-transitory, computer-readable medium having stored therein instructions for causing a processor to perform a method according to claim 4.

20. A light field device comprising:

a capture unit for capturing light field data and a device according to claim 10.

* * * * *